US012469945B2

(12) United States Patent
Yoshimoto et al.

(10) Patent No.: US 12,469,945 B2
(45) Date of Patent: Nov. 11, 2025

(54) DIELECTRIC WAVEGUIDE LINE

(71) Applicant: DAIKIN INDUSTRIES, LTD., Osaka (JP)

(72) Inventors: Hiroyuki Yoshimoto, Osaka (JP); Katsusada Tokuhira, Osaka (JP); Taku Yamanaka, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 219 days.

(21) Appl. No.: 17/889,733

(22) Filed: Aug. 17, 2022

(65) Prior Publication Data

US 2022/0407206 A1 Dec. 22, 2022

Related U.S. Application Data

(63) Continuation of application No. PCT/JP2021/006402, filed on Feb. 19, 2021.

(30) Foreign Application Priority Data

Feb. 20, 2020 (JP) ................................ 2020-027067

(51) Int. Cl.
*H01P 3/16* (2006.01)
*C08F 14/26* (2006.01)
(Continued)

(52) U.S. Cl.
CPC ................ *H01P 3/16* (2013.01); *C08F 14/26* (2013.01); *H01P 1/2002* (2013.01); *H01P 3/12* (2013.01)

(58) Field of Classification Search
CPC ............. H01P 1/2002; H01P 3/12; H01P 3/16
(Continued)

(56) References Cited

U.S. PATENT DOCUMENTS

| | | | |
|---|---|---|---|
| 4,463,329 | A | 7/1984 | Suzuki |
| 2010/0062235 | A1 | 3/2010 | Nadella et al. |
| 2018/0040936 | A1 | 2/2018 | Yoshimoto et al. |

FOREIGN PATENT DOCUMENTS

| | | | |
|---|---|---|---|
| JP | 58-075301 | A | 5/1983 |
| JP | 2008-242449 | A | 10/2008 |

(Continued)

OTHER PUBLICATIONS

Ravi K. Moorthy, et al.,"Flexible Dielectric Waveguide for MM Application Using GORE-TEX Expanded Ptfe Dielectric", International Conference on Submillimeter eaves and their Application, IEEE, Dec. 7, 1981 (2 pages).

(Continued)

*Primary Examiner* — Rakesh B Patel
(74) *Attorney, Agent, or Firm* — Sughrue Mion, PLLC

(57) ABSTRACT

A dielectric waveguide including: a center dielectric A1; a dielectric layer A2 surrounding the center dielectric A1; and a dielectric layer A3 surrounding the dielectric layer A2, the center dielectric A1 including polytetrafluoroethylene, the center dielectric A1, the dielectric layer A2, and the dielectric layer A3 having relative permittivities at 25° C. and 6 GHz represented by $\varepsilon_{A1}$, $\varepsilon_{A2}$, and $\varepsilon_{A3}$, respectively, $\varepsilon_{A1}$, $\varepsilon_{A2}$, and $\varepsilon_{A3}$ satisfying the following: $\varepsilon_{A1}$ is 2.20 or lower; $\varepsilon_{A2}$ is 1.90 or lower; $\varepsilon_{A3}$ is 1.55 or lower; and $\varepsilon_{A1}>\varepsilon_{A2}>\varepsilon_{A3}$ is satisfied.

5 Claims, 1 Drawing Sheet

(51) Int. Cl.
*H01P 1/20* (2006.01)
*H01P 3/12* (2006.01)

(58) Field of Classification Search
USPC .......................... 333/157, 208–212, 239, 248
See application file for complete search history.

(56) References Cited

FOREIGN PATENT DOCUMENTS

| | | | |
|---|---|---|---|
| JP | 2016-195295 | A | 11/2016 |
| WO | 2016/159314 | A1 | 10/2016 |

OTHER PUBLICATIONS

Extended European Search Report dated Jan. 22, 2024 in counterpart EP Application No. 21757223.9.
International Search Report for PCT/JP2021/006402 dated May 11, 2021.
International Preliminary Report on Patentability with the translation of Written Opinion dated Aug. 23, 2022 from the International Bureau in International Application No. PCT/JP2021/006402.

DIELECTRIC WAVEGUIDE LINE

CROSS REFERENCE TO RELATED APPLICATIONS

This application is a Rule 53(b) Continuation of International Application No. PCT/JP2021/006402 filed Feb. 19, 2021 which claims priority from Japanese patent application No. 2020-027067 filed Feb. 20, 2020, each of the above-noted applications being incorporated herein by reference in their respective entireties.

TECHNICAL FIELD

The disclosure relates to dielectric waveguides.

BACKGROUND ART

Use of a polytetrafluoroethylene molded article for a waveguide configured to transmit millimeter waves and submillimeter waves is known.

Patent Literature 1 discloses a dielectric waveguide including a polytetrafluoroethylene molded article having a permittivity, a loss tangent, and a hardness each within a specific range.

CITATION LIST

Patent Literature

Patent Literature 1: WO 2016/159314 A

SUMMARY

The disclosure relates to a dielectric waveguide including: a center dielectric A1, a dielectric layer A2 surrounding the center dielectric A1; and a dielectric layer A3 surrounding the dielectric layer A2, the center dielectric A1 containing polytetrafluoroethylene, the center dielectric A1, the dielectric layer A2, and the dielectric layer A3 having relative permittivities $\varepsilon_{A1}$, $\varepsilon_{A2}$, and $\varepsilon_{A3}$ at 25° C. and 6 GHz, respectively, $\varepsilon_{A1}$, $\varepsilon_{A2}$, and $\varepsilon_{A3}$ satisfying the following: $\varepsilon_{A1}$ is 2.20 or lower; $\varepsilon_{A2}$ is 1.90 or lower; $\varepsilon_{A3}$ is 1.55 or lower; and $\varepsilon_{A1}>\varepsilon_{A2}>\varepsilon_{A3}$ is satisfied.

Advantageous Effects

The disclosure can provide a dielectric waveguide capable of reducing electromagnetic wave penetration.

DESCRIPTION OF EMBODIMENTS

Figure 1:
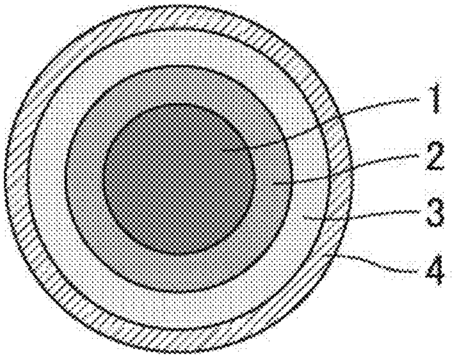
FIG. 1 is a schematic cross-sectional view of an example of a first dielectric waveguide.

Hereinafter, the disclosure is specifically described.

The disclosure relates to a dielectric waveguide including: a center dielectric A1; a dielectric layer A2 surrounding the center dielectric A1; and a dielectric layer A3 surrounding the dielectric layer A2, the center dielectric A1 containing polytetrafluoroethylene, the center dielectric A1, the dielectric layer A2, and the dielectric layer A3 having relative permittivities $\varepsilon_{A1}$, $\varepsilon_{A2}$, and $\varepsilon_{A3}$ at 25° C. and 6 GHz, respectively, $\varepsilon_{A1}$, $\varepsilon_{A2}$, and $\varepsilon_{A3}$ satisfying the following: $\varepsilon_{A1}$ is 2.20 or lower; $\varepsilon_{A2}$ is 1.90 or lower; $\varepsilon_{A3}$ is 1.55 or lower; and $\varepsilon_{A1}>\varepsilon_{A2}>\varepsilon_{A3}$ is satisfied (hereafter, also referred to as a first dielectric waveguide).

The first dielectric waveguide having the above configuration can reduce electromagnetic wave penetration where electromagnetic waves pass through the external layer of the dielectric waveguide to leak out to the outside. As a result, transmission losses can be reduced, so that the transmission efficiency of electromagnetic waves, particularly millimeter waves and submillimeter waves, can be improved.

The first dielectric waveguide can also reduce group delay in the dielectric waveguide, reducing errors.

In the first dielectric waveguide, provided that the center dielectric A1, the dielectric layer A2, and the dielectric layer A3 have relative permittivities $\varepsilon_{A1}$, $\varepsilon_{A2}$, and $\varepsilon_{A3}$ at 25° C. and 6 GHz, respectively, the following are satisfied: $\varepsilon_{A1}$ is 2.20 or lower; $\varepsilon_{A2}$ is 1.90 or lower; $\varepsilon_{A3}$ is 1.55 or lower; and $\varepsilon_{A1}>\varepsilon_{A2}>\varepsilon_{A3}$ is satisfied. Including at least three layers of dielectrics with relative permittivities that outwardly gradually decrease, the waveguide has a smaller relative permittivity difference between layers as compared with a waveguide including only two layers of dielectrics, leading to reduction of electromagnetic wave penetration.

$\varepsilon_{A1}$ is 2.20 or lower, preferably 2.15 or lower and preferably 1.80 or higher, more preferably 1.90 or higher, still more preferably 2.00 or higher.

$\varepsilon_{A2}$ is 1.90 or lower, preferably 1.80 or lower, more preferably 1.75 or lower and preferably 1.50 or higher, more preferably 1.60 or higher.

$\varepsilon_{A3}$ is 1.55 or lower, preferably 1.45 or lower and is preferably 1.01 or higher, more preferably 1.25 or higher, still more preferably 1.30 or higher.

In the first dielectric waveguide, a ratio $\varepsilon_{A2}/\varepsilon_{A1}$ of $\varepsilon_{A2}$ to $\varepsilon_{A1}$ is preferably 0.65 to 0.95. The ratio $\varepsilon_{A2}/\varepsilon_{A1}$ is more preferably 0.92 or lower, still more preferably 0.90 or lower and more preferably 0.70 or higher, still more preferably 0.80 or higher.

The ratio $\varepsilon_{A2}/\varepsilon_{A1}$ within the above range can contribute to further reduction of electromagnetic wave penetration.

In the first dielectric waveguide, a ratio $\varepsilon_{A3}/\varepsilon_{A2}$ of $\varepsilon_{A3}$ to $\varepsilon_{A2}$ is preferably 0.65 to 0.95. The ratio $\varepsilon_{A3}/\varepsilon_{A2}$ is more preferably 0.92 or lower, still more preferably 0.90 or lower and more preferably 0.70 or higher, still more preferably 0.80 or higher.

The ratio $\varepsilon_{A3}/\varepsilon_{A2}$ within the above range can contribute to further reduction of electromagnetic wave penetration.

Between the layers including the center dielectric A1, the dielectric layer A2, and the dielectric layer A3, at least one dielectric layer may be further provided. In this embodiment, an outer layer of the layers including the at least one dielectric layer preferably has a lower relative permittivity at 25° C. and 6 GHz. Such a configuration can contribute to further reduction of electromagnetic wave penetration.

At least one dielectric layer surrounding the dielectric layer A3 may be further provided. In this embodiment, an outer layer of the at least one dielectric layer preferably has a lower relative permittivity at 25° C. and 6 GHz. Such a configuration can contribute to further reduction of electromagnetic wave penetration.

The at least one dielectric layer may have a relative permittivity equal to or higher than $\varepsilon_{A3}$ at 25° C. and 6 GHz.

The relative permittivities of the center dielectric A1 and the dielectric layers are measured as follows. A sample in a square bar shape (2.0 mm×2.0 mm×110 mm) is cut out of a target dielectric, and the relative permittivity of the sample is measured at 25° C. and 6 GHz using a cavity resonator.

In the case of a target dielectric consisting only of one resin, the specific gravity of the dielectric may be measured first, and the relative permittivity can be calculated from the measured specific gravity based on the correlation between the specific gravity and relative permittivity of the resin. Normally, the specific gravity and relative permittivity of a resin have a linear relation. A person skilled in the art would be able to obtain a relational expression for each resin based on the numerical data preliminarily obtained by measuring the relative permittivities at various specific gravities.

The specific gravity is measured by hydrostatic weighing (in accordance with JIS Z 8807).

The center dielectric A1 preferably has a specific gravity of 1.500 or higher, more preferably 1.700 or higher, still more preferably 1.900 or higher. The upper limit is not limited, and may be 2.250.

The dielectric layer A2 preferably has a specific gravity of 1.700 or lower, more preferably 1.500 or lower, still more preferably 1.400 or lower. The specific gravity is preferably 0.350 or higher, more preferably 0.900 or higher, still more preferably 1.100 or higher.

The dielectric layer A3 preferably has a specific gravity of 1.000 or lower, more preferably 0.850 or lower and preferably 0.010 or higher, more preferably 0.450 or higher, still more preferably 0.550 or higher.

In the first dielectric waveguide, preferably, the specific gravity of the dielectric layer A2 is lower than the specific gravity of the center dielectric A1, and the specific gravity of the dielectric layer A3 is lower than the specific gravity of the dielectric layer A2.

Preferably, provided that the center dielectric A1, the dielectric layer A2, and the dielectric layer A3 have loss tangents tan $\delta_{A1}$, tan $\delta_{A2}$, and tan $\delta_{A3}$ at 25° C. and 6 GHz, respectively, the following are satisfied: tan $\delta_{A1}$ is $2.20\times10^{-4}$ or lower; tan $\delta_{A2}$ is $1.20\times10^{-4}$ or lower; and tan $\delta_{A3}$ is $1.00\times10^{-4}$ or lower.

The layers having loss tangents within the above ranges can contribute to further reduction of electromagnetic wave penetration.

tan $\delta_{A1}$, is more preferably $2.10\times10^{-4}$ or lower. tan $\delta_{A1}$, may be $0.10\times10^{-4}$ or higher, or $0.50\times10^{-4}$ or higher.

tan $\delta_{A2}$ is more preferably $1.00\times10^{-4}$ or lower. tan $\delta_{A2}$ may be $0.10\times10^{-4}$ or higher, or $0.30\times10^{-4}$ or higher.

tan $\delta_{A3}$ is more preferably $0.80\times10^{-4}$ or lower. tan $\delta_{A3}$ may be $0.10\times10^{-4}$ or higher, or $0.20\times10^{-4}$ or higher.

According to a preferred embodiment of the first dielectric waveguide, tan $\delta_{A1}$>tan $\delta_{A2}$>tan $\delta_{A3}$ is satisfied.

The loss tangents of the center dielectric A1 and the dielectric layers are measured as follows. A sample in a square bar shape (2.0 mm×2.0 mm×110 mm) is cut out of a target dielectric, and the loss tangent of the sample is measured at 25° C. and 6 GHz using a cavity resonator.

The center dielectric A1 contains PTFE. The PTFE may be either a TFE homopolymer consisting only of tetrafluoroethylene (TFE) or a modified PTFE. The modified PTFE contains a TFE unit and a modifying monomer unit based on a modifying monomer copolymerizable with TFE. The modifying monomer unit as used herein means a moiety that is part of a molecular structure of the PTFE and is derived from the modifying monomer. The modified PTFE may be uniformly modified or may have a core-shell structure described later.

The modifying monomer may be any monomer copolymerizable with TFE. Examples thereof include perfluoroolefins such as hexafluoropropylene (HFP); perhaloolefins such as chlorotrifluoroethylene (CTFE); hydrogen-containing fluoroolefins such as trifluoroethylene and vinylidene fluoride (VDF); perfluorovinyl ethers; (perfluoroalkyl)ethylenes; ethylene; and fluorine-containing vinyl ethers containing a nitrile group. A single modifying monomer or multiple modifying monomers may be used.

Examples of the perfluorovinyl ethers include, but are not limited to, perfluoro unsaturated compounds represented by the following formula (1):

$$CF_2{=}CF{-}ORf^1 \quad (1)$$

wherein $Rf^1$ represents a perfluoro organic group. The term "perfluoro organic group" as used herein means an organic group in which all the hydrogen atoms bonded to the carbon atoms are replaced by fluorine atoms. The perfluoro organic group may contain ether oxygen.

The examples of the perfluorovinyl ethers also include a perfluoro(alkyl vinyl ether) (PAVE) wherein $Rf^1$ in the above formula (1) is a C1-C10 perfluoroalkyl group. The number of carbon atoms in the perfluoroalkyl group is preferably 1 to 5.

Examples of the perfluoroalkyl group in the PAVE include perfluoromethyl, perfluoroethyl, perfluoroprolyl, perfluorobutyl, perfluoropentyl, and perfluorohexyl groups.

Preferred is a perfluoropropyl group. The PAVE is preferably perfluoropropyl vinyl ether (PPVE) in which the perfluoroalkyl group is a perfluoropropyl group.

The examples of the perfluorovinyl ethers also include those wherein $Rf^1$ in the above formula (1) is a C4-C9 perfluoro(alkoxyalkyl) group, those wherein $Rf^1$ is a group represented by the following formula:

[Chem. 1]

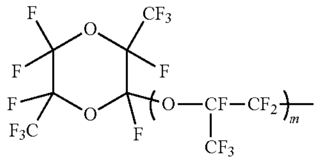

wherein m is 0 or an integer of 1 to 4, and those wherein $Rf^1$ is a group represented by the following formula:

[Chem. 2]

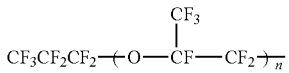

wherein n is an integer of 1 to 4.

Examples of the (perfluoroalkyl)ethylenes (PFAE) include, but are not limited to, (perfluorobutyl)ethylene (PFBE) and (perfluorohexyl)ethylene (PFHE).

The fluorine-containing vinyl ether containing a nitrile group is more preferably a fluorine-containing vinyl ether represented by $CF_2{=}CFORf^2CN$ (wherein $Rf^2$ is a C2-C7 alkylene group in which an oxygen atom is optionally inserted between two carbon atoms).

The modifying monomer in the modified PTFE preferably includes at least one selected from the group consisting of HFP, CTFE, VDF, PPVE, PFAE, and ethylene. More preferred is PAVE, and still more preferred is PPVE.

The modified PTFE may have a core-shell structure consisting of a particle core and a particle shell.

The polymerized unit based on the modifying monomer (modifying monomer unit) is preferably contained in an amount within a range of 0.00001 to 1.0% by mass. The lower limit of the amount of the modifying monomer unit is more preferably 0.0001% by mass, more preferably 0.0005% by mass, still more preferably 0.001% by mass. The upper limit of the amount of the modifying monomer unit is preferably 0.90% by mass, more preferably 0.50% by mass, still more preferably 0.40% by mass, further preferably 0.30% by mass, even more preferably 0.10% by mass, particularly preferably 0.08% by mass, particularly preferably 0.05% by mass, particularly preferably 0.01% by mass.

The amount of each monomer constituting PTFE herein can be calculated by NMR, FT-IR, elemental analysis, and fluorescence X-ray analysis appropriately combined in accordance with the type of the monomer.

The PTFE preferably has fibrillability. The fibrillability refers to a fibril formation property by easy fiberization.

Whether or not the PTFE has fibrillability can be determined by "paste extrusion" which is a representative method for molding "high molecular weight PTFE powder" (powder produced from a TFE emulsion polymer). Typically, paste extrusion is enabled by the fibrillability of high molecular weight PTFE powder. In the case where an unsintered molded article obtained by paste extrusion has no substantial strength or elongation, e.g., in the case where the molded article has an elongation of 0% and is cut by pulling, the PTFE can be considered to have no fibrillability.

The PTFE preferably has non-melt-secondary-processibility. The non-melt-secondary-processibility means that the melt flow rate cannot be measured in accordance with ASTM D-1238 and D-2116 at temperatures higher than the crystallization temperature/melting point.

The PTFE preferably has a standard specific gravity (SSG) of 2.13 to 2.23, more preferably 2.15 to 2.19. The standard specific gravity is a value measured by the water displacement method in accordance with ASTM D-792 using a sample prepared in accordance with ASTM D 4895-98.

The PTFE preferably has a first melting point of 333° C. to 347° C., more preferably 335° C. to 345° C. The first melting point is the temperature corresponding to the maximum on a heat-of-fusion curve when PTFE having never been heated up to 300° C. or higher is heated using a differential scanning calorimeter (DSC) at a temperature-increasing rate of 10° C./min.

The PTFE may be a combination of high molecular weight PTFE and low molecular weight PTFE. The high molecular weight PTFE preferably has a first melting point of 333° C. to 347° C., more preferably 335° C. to 345° C. The low molecular weight PTFE preferably has a first melting point of 322° C. to 333° C., more preferably 324° C. to 332° C. The first melting point is the temperature corresponding to the maximum on a heat-of-fusion curve when PTFE having never been heated up to 300° C. or higher is heated using a differential scanning calorimeter (DSC) at a temperature-increasing rate of 10° C./min.

The ratio by mass between the high molecular weight PTFE and the low molecular weight PTFE is preferably 80/20 to 99/1, more preferably 85/15 to 97/3, still more preferably 90/10 to 95/5.

The center dielectric A1 may contain a resin other than the PTFE. The resin other than the PTFE is preferably a TFE/hexafluoropropylene (HFP) copolymer (FEP), a TFE/perfluoro(alkyl vinyl ether) (PAVE) copolymer (PFA), or a polyolefin.

The examples of the resin other than the PTFE also include ethylene/TFE copolymers (ETFE), polyvinylidene fluoride (PVdF), and polychlorotrifluoroethylene (PCTFE).

The center dielectric A1 may contain any other components. Examples of the other components include surfactants, antioxidants, light stabilizers, fluorescent brighteners, colorants, pigments, dyes, and fillers. The examples also include powder or fibrous powder of carbon black, graphite, alumina, mica, silicon carbide, boron nitride, titanium oxide, bismuth oxide, bronze, gold, silver, copper, or nickel.

The other components of the center dielectric A1 may include high-permittivity inorganic particles. Examples of the high-permittivity inorganic particles include particles of barium titanate, calcium titanate, strontium titanate, magnesium titanate, lead titanate, zinc titanate, lead zirconate, calcium zirconate, strontium zirconate, barium titanate zirconate, or lead titanate zirconate.

Even in the case where the center dielectric A1 contains a resin other than the PTFE and/or the above other components, the proportion of the PTFE in the center dielectric A1 is preferably 99.0% by mass or higher, more preferably 99.9% by mass or higher.

The dielectric layers A2 and A3 each preferably contain at least one resin A selected from the group consisting of PTFE, a TFE/hexafluoropropylene (HFP) copolymer (FEP), a TFE/perfluoro(alkyl vinyl ether) (PAVE) copolymer (PFA), and a polyolefin.

Examples of the PTFE for the resin A include the same PTFE usable in the center dielectric A1.

The FEP may be any FEP, and is preferably a copolymer having a molar ratio (TFE unit/HFP unit) of a TFE unit to a HFP unit of 70/30 or more and less than 99/1. The molar ratio is more preferably 70/30 or more and 98.9/1.1 or less, still more preferably 80/20 or more and 97/3 or less. The FEP having too small a TFE proportion tends to have lower mechanical properties, while the FEP having too large a TFE unit proportion tends to have too high a melting point which leads to poor moldability. The FEP is also preferably a copolymer containing 0.1 to 10 mol % of a monomer unit derived from a monomer copolymerizable with TFE and HFP and 90 to 99.9 mol % in total of the TFE unit and the HFP unit. Examples of the monomer copolymerizable with TFE and HFP include PAVE and an alkyl perfluorovinyl ether derivative.

The FEP preferably has a melting point of 150° C. to 320° C., more preferably 200° C. to 300° C., still more preferably 240° C. to 280° C. The melting point is the temperature corresponding to the maximum on a heat-of-fusion curve obtained by heating the FEP using a differential scanning calorimeter (DSC) at a temperature-increasing rate of 10° C./min.

The FEP preferably has a melt flow rate (MFR) of 0.01 to 100 g/10 min, more preferably 0.1 to 80 g/10 min, still more preferably 1 to 60 g/10 min, particularly preferably 1 to 50 g/10 min.

MFR herein is a value obtained by the measurement in accordance with ASTM D 1238 at a temperature of 372° C. and a load of 5 kg.

Examples of PAVE in the PFA include compounds represented by the formula (10):

$$CF_2{=}CF{-}ORf^{10} \qquad (10)$$

wherein $Rf^{10}$ is a C1-C10, preferably C1-C5 perfluoroalkyl group. Among these, preferred are perfluoro(methyl vinyl ether) (PMVE), perfluoro(ethyl vinyl ether) (PEVE), and perfluoro(propyl vinyl ether) (PPVE).

The PFA may be any PFA, and is preferably a copolymer having a molar ratio (TFE unit/PAVE unit) of a TFE unit to a PAVE unit of 70/30 or more and less than 99.5/0.5. The molar ratio is more preferably 70/30 or more and 98.9/1.1 or less, still more preferably 80/20 or more and 98.5/1.5 or less. PFA having too small a TFE unit proportion tends to have lower mechanical characteristics, while PFA having too large a TFE unit proportion tends to have too high a melting point which leads to poor moldability. The PFA may be a copolymer consisting only of TFE and PAVE, or preferably a copolymer additionally containing 0.1 to 10 mol % of a monomer unit derived from a monomer copolymerizable with TFE and PAVE and 90 to 99.9 mol % in total of the TFE unit and the PAVE unit. Examples of the monomer copolymerizable with TFE and PAVE include HFP, a vinyl monomer represented by $CZ^1Z^2{=}CZ^3(CF_2)nZ^4$ (wherein $Z^1$, $Z^2$, and $Z^3$ are the same as or different from one another and each are a hydrogen atom or a fluorine atom; $Z^4$ is a hydrogen atom, a fluorine atom, or a chlorine atom; and n is an integer of 2 to 10), and an alkyl perfluoro vinyl ether derivative represented by $CF_2{=}CF{-}OCH_2{-}Rf^{11}$ (wherein $Rf^{11}$ is a C1-C5 perfluoroalkyl group).

The PFA preferably has a melting point of 180° C. to 340° C., more preferably 230° C. to 330° C., still more preferably 280° C. to 320° C. The melting point is the temperature corresponding to the maximum on a heat-of-fusion curve when PFA is heated using a differential scanning calorimeter (DSC) at a temperature-increasing rate of 10° C./min.

The PFA preferably has a MFR of 0.1 to 100 g/10 min, more preferably 0.5 to 90 g/10 min, still more preferably 1.0 to 85 g/10 min.

The amount of each monomer unit constituting the fluororesin herein can be calculated by NMR, FT-IR, elemental analysis, and fluorescence X-ray analysis appropriately combined in accordance with the type of the monomer.

The FEP and the PFA are preferably fluorinated in advance. The fluorination can reduce thermally and electrically unstable end groups (unstable end groups) such as $-COOH$, $-CH_2OH$, $-COF$, and $-CONH_2$, improving transmission efficiency.

The fluorination can be performed by a known method. For example, the fluorination can be performed by bringing a non-fluorinated fluororesin into contact with a fluorine-containing compound.

Examples of the fluorine-containing compound include a fluorine radical source generating fluorine radicals under fluorination conditions, such as $F_2$ gas, $CoF_3$, $AgF_2$, $UF_6$, $OF_2$, $N_2F_2$, $CF_3OF$, and halogen fluorides (e.g., $IF_5$, $ClF_3$).

Examples of the polyolefin include polyethylene and polypropylene. Preferred among these is polyethylene.

The resin A is preferably at least one selected from the group consisting of PTFE, FEP, PFA, and polyolefins, more preferably at least one selected from the group consisting of PTFE and polyolefins, still more preferably at least one selected from the group consisting of PTFE and polyethylene, particularly preferably PTFE.

The resin A is also preferably a polyolefin, or polyethylene.

The dielectric layers A2 and A3 may further contain any other components. Examples of the other components include the same other components usable in the center dielectric A1.

The dielectric layers A2 and A3 preferably contain 99.0% by mass or more, more preferably 99.9% by mass or more of the resin A in the dielectric layers A2 and A3.

The first dielectric waveguide may further include a protective layer surrounding the dielectric layer A3 (surrounding an additional dielectric layer when the additional dielectric layer surrounding the dielectric layer A3 is provided). The protective layer is optionally provided to protect the dielectric layer positioned on the inner side. The protective layer can be composed of materials such as polyvinyl chloride, polyolefins, and fluororesins.

The first dielectric waveguide can be suitably produced by a production method including molding PTFE to obtain a center dielectric A1 and forming dielectric layers A2 and A3 surrounding the center dielectric A1.

The PTFE is molded into a center dielectric A1. The center dielectric A1 may include an unsintered PTFE molded article, a semi-sintered PTFE molded article, or a sintered PTFE molded article.

The unsintered PTFE molded article can be obtained by paste extrusion molding of a mixture containing unsintered PTFE powder and an extrusion aid. After the paste extrusion molding, the resulting extrudate may be dried for removal of the extrusion aid. The mixture may be obtained by mixing unsintered PTFE powder and an extrusion aid by a known method, aging the mixture for 1 to 24 hours, and pre-molding the mixture at a pressure of 0.5 to 2.0 MPa. The paste extrusion can be performed at an extrusion pressure of 2 to 100 MPa.

The unsintered PTFE molded article may be stretched, if necessary, to provide an unsintered, stretched PTFE molded article.

The unsintered PTFE is PTFE having never been heated up to 326° C. or higher, preferably PTFE having never been heated up to 300° C. or higher.

The semi-sintered PTFE molded article can be obtained by, for example, heating an unsintered PTFE molded article at 320° C. to 340° C., preferably at 330° C. to 340° C., for 10 seconds to 180 minutes. The semi-sintered PTFE molded article is also preferably obtained by heating unsintered PTFE to a temperature not higher than 345° C.

The heating may be performed using a device such as a salt bath, a sand bath, or a hot air circulating electric furnace.

The sintered PTFE molded article can be, for example, obtained by heating an unsintered PTFE molded article to the primary melting point of PTFE or higher, preferably higher than 340° C., more preferably higher than 345° C., still more preferably 350° C. or higher, for 10 seconds to 180 minutes.

The heating can be performed using a device such as a salt bath, a sand bath, or a hot air circulating electric furnace.

The specific gravity and crystallinity of the resin can be controlled by adjusting the presence or absence of the stretching and/or the sintering and conditions for them, resulting in adjustment of the relative permittivity of the center dielectric A1. Normally, when the stretch ratio is higher or the crystallinity is lower, the relative permittivity is lower.

The dielectric layers A2 and A3 can be formed by extruding, around the center dielectric A1, the resin A which is to constitute each of the dielectric layers A2 and A3, by a known method. The resin A for the dielectric layer A2 and the resin A for the dielectric layer A3 may be individually extruded or they may be coextruded.

The (co)extrusion is preferably paste (co)extrusion when the resin A is PTFE and is preferably melt (co)extrusion when the resin A is a melt-fabricable resin. The paste coextrusion can be performed following the method disclosed in JP 2001-357730 A, for example.

The dielectric layers A2 and A3 can be also produced by winding sheets (tapes) containing the resin A which is to constitute each of the dielectric layers A2 and A3, around the center dielectric A1. Alternatively, the dielectric layers A2 and A3 can be produced by covering the center dielectric A1 with tubes containing the resin A which is to constitute each of the dielectric layers A2 and A3. Production using the sheets (tapes) or the tubes can be carried out following the method disclosed in WO 2012/07760 or the method disclosed in WO 2016/159314, for example.

Upon formation of the dielectric layers A2 and A3, the resin A may be subjected to a treatment such as stretching, foaming, or sintering. The specific gravity and crystallinity of the resin can be controlled by adjusting the presence or absence of these treatments and treatment conditions, resulting in adjustment of the relative permittivities of the dielectric layers A2 and A3. Normally, when the stretch ratio or the foaming ratio is higher or the crystallinity is lower, the relative permittivity is lower.

When the resin A is PTFE, the relative permittivity is preferably adjusted by stretching or sintering. The stretching and sintering may be performed by any known methods. The relative permittivity can be also adjusted by the foaming method disclosed in WO 2005/019320.

When the resin A is FEP or PFA, the relative permittivity is preferably adjusted by foaming. Any foaming method may be used. Examples include a known method including charging a screw extruder designed for foaming operation with FEP or PFA and performing continuous gas injection. The gas used may be a gas such as chlorodifluoromethane gas, nitrogen gas, or carbon dioxide gas, or a mixture of these gases. The gas may be introduced into the molten resin in the extruder in the form of a pressurized gas or generated from a chemical foaming agent blended in the molten resin. In order to generate finer bubbles or achieve uniform distribution, a foaming nucleating agent may be provided in the resin.

When the resin A is a polyolefin, the relative permittivity is preferably adjusted by foaming. Any foaming method may be used, and examples include a known method such as melt foaming.

The dielectric layers A2 and A3 each preferably contain at least one selected from the group consisting of unsintered PTFE, stretched PTFE, foamed FEP, foamed PFA, and foamed polyolefins, more preferably at least one selected from the group consisting of unsintered PTFE, stretched PTFE, and foamed polyolefins, still more preferably at least one selected from the group consisting of unsintered PTFE, stretched PTFE, and foamed polyethylene, particularly preferably at least one selected from the group consisting of unsintered PTFE and stretched PTFE.

The dielectric layers A2 and A3 each also preferably contain a foamed polyolefin, or foamed polyethylene.

The first dielectric waveguide preferably includes the center dielectric A1, the dielectric layer A2, and the dielectric layer A3 as waveguide media. The first dielectric waveguide is preferably a dielectric waveguide that transmits high-frequency waves such as millimeter waves and submillimeter waves by utilizing the relative permittivity difference between the dielectrics.

The disclosure also relates to a dielectric waveguide including a dielectric B containing PTFE, the dielectric B being seamlessly and integrally formed of a single material and having a relative permittivity that gradually decreases outwardly in a radial direction at 25° C. and 6 GHz (hereafter, also referred to as a second dielectric waveguide).

The second dielectric waveguide having the above configuration can reduce electromagnetic wave penetration. As a result, transmission losses can be reduced, so that the transmission efficiency of electromagnetic waves, particularly millimeter waves and submillimeter waves, can be improved.

The second dielectric waveguide can also reduce group delay in the dielectric waveguide, reducing errors.

In the second dielectric waveguide, the dielectric B is seamlessly and integrally formed of a single material and has a relative permittivity that gradually decreases outwardly in the radial direction at 25° C. and 6 GHz. The dielectric having a relative permittivity that gradually decreases outwardly in the radial direction can reduce the difference in relative permittivity between portions as compared with a waveguide including two dielectric layers having different relative permittivities, reducing electromagnetic wave penetration. Seamless and integral formation of the dielectric eliminates the need for a process of forming multiple dielectric layers.

In the dielectric B, the relative permittivity preferably continuously (steplessly) decreases outwardly in the radial direction.

In the dielectric B, the relative permittivity decreasing rate is preferably 0.005% or higher, more preferably 0.01% or higher, still more preferably 0.1% or higher, and preferably 20% or lower, more preferably 10% or lower, still more preferably 5% or lower, per millimeter outwardly in the radial direction.

The relative permittivity at the center portion of the dielectric B is preferably 2.30 or lower, more preferably 2.25 or lower, and preferably 1.90 or higher, more preferably 2.00 or higher, still more preferably 2.10 or higher.

The relative permittivity at the outer peripheral portion of the dielectric B is preferably 2.10 or lower, more preferably 2.00 or lower, and preferably 1.30 or higher, more preferably 1.50 or higher, still more preferably 1.70 or higher.

When the second dielectric waveguide has a curved shape, a difference Δε in relative permittivity between the center portion and the outer peripheral portion of the dielectric B (center portion–outer peripheral portion) is preferably 0.5 or more. The upper limit may be 1.50. When the second dielectric waveguide is in the form of a straight line, Δε is preferably more than 0 and less than 0.5.

At least one dielectric layer may be further provided around the dielectric B. In this embodiment, the relative permittivity of the at least one dielectric layer at 25° C. and 6 GHz is preferably lower than the relative permittivity at the outer peripheral portion of the dielectric B. Also, an outer layer preferably has a lower relative permittivity. With such a configuration, electromagnetic wave penetration can be further reduced.

The relative permittivity of the at least one dielectric layer at 25° C. and 6 GHz may also be set to equal to or higher than the relative permittivity at the outer peripheral portion of the dielectric B.

The relative permittivity of each portion of the dielectric B or of each dielectric layer is measured as follows. A sample in a square bar shape (2.0 mm×2.0 mm×110 mm) is cut out of a measurement target portion, and the relative permittivity of the sample is measured at 25° C. and 6 GHz using a cavity resonator.

When the measurement target dielectric consists only of one resin, the specific gravity of the measurement target portion may be measured first, and the relative permittivity can be calculated from the measured specific gravity based on the correlation between the specific gravity and relative permittivity of the resin. Normally, the specific gravity and relative permittivity of the resin have a linear relationship. A person skilled in the art would be able to obtain a relational expression for each resin based on the numerical value data obtained by measuring the relative permittivities at various specific gravities.

The specific gravity is measured by hydrostatic weighing (in accordance with JIS Z 8807).

In the dielectric B, the specific gravity preferably gradually decreases outwardly in the radial direction. The specific gravity also preferably continuously (steplessly) decreases outwardly in the radial direction.

The loss tangent at the center portion of the dielectric B is preferably $2.20\times10^{-4}$ or less, more preferably $2.10\times10^{-4}$ or less, and may be $0.10\times10^{-4}$ or more, or $0.50\times10^{-4}$ or more.

The loss tangent at the center portion of the dielectric B is preferably $1.00\times10^{-4}$ or less, more preferably $0.80\times10^{-4}$ or less, and may be $0.10\times10^{-4}$ or more, or $0.20\times10^{-4}$ or more.

In the dielectric B, the loss tangent preferably gradually decreases outwardly in the radial direction. The loss tangent also preferably continuously (steplessly) decreases outwardly in the radial direction.

The loss tangent of the dielectric B is measured as follows. A sample in a square bar shape (2.0 mm×2.0 mm×110 mm) is cut out of a measurement target dielectric, and the loss tangent of the sample is measured at 25° C. and 6 GHz using a cavity resonator.

The dielectric B contains PTFE. Examples of the PTFE usable in the dielectric B include the same PTFE usable in the center dielectric A1 described above.

The dielectric B may further contain resins other than the PTFE and any other components. Examples of the resins other than the PTFE and other components include the same resins and other components usable in the center dielectric A1 described above.

Even when containing the resin other than the PTFE or the other components, the dielectric B preferably contains the PTFE in an amount of 99.0% by mass or more, more preferably 99.9% by mass or more in the dielectric B.

The dielectric B may be the innermost layer in the second dielectric waveguide.

The second dielectric waveguide may further include a protective layer surrounding the dielectric B (surrounding an additional dielectric layer when the additional dielectric layer surrounding the dielectric B is provided). The protective layer is optionally provided to protect the dielectric layer(s) positioned on the inner side. The protective layer can be composed of materials such as polyvinyl chloride, polyolefins, and fluororesins.

The second dielectric waveguide can be suitably produced by a production method including molding unsintered PTFE to obtain an unsintered PTFE molded article, heating the unsintered PTFE molded article to a temperature not lower than the first melting point of the PTFE, and rapidly cooling the outer periphery of the heated PTFE molded article to obtain a dielectric B.

Rapid cooling of the outer periphery of the PTFE molded article having been heated to a temperature not lower than the first melting point of the PTFE lowers the crystallinity of PTFE at around the outer periphery, lowering the relative permittivity. In contrast, heat at around the center of the PTFE molded article is less likely to escape as compared with the outer periphery, and therefore the center portion of the PTFE molded article is slowly cooled to have higher crystallinity, leading to higher relative permittivity. Thus, the resulting dielectric B is seamlessly and integrally formed of a single material and has a relative permittivity that gradually decreases outwardly in the radial direction.

The unsintered PTFE is PTFE having never been heated up to 326° C. or higher, preferably PTFE having never been heated up to 300° C. or higher.

The unsintered PTFE molded article can be obtained by paste extrusion molding of a mixture containing unsintered PTFE powder and an extrusion aid. After the paste extrusion molding, the resulting extrudate may be dried for removal of the extrusion aid. The mixture may be obtained by mixing unsintered PTFE powder and an extrusion aid by a known method, aging the mixture for 1 to 24 hours, and pre-molding the mixture at a pressure of 0.5 to 2.0 MPa. The paste extrusion can be performed at an extrusion pressure of 2 to 100 MPa.

The heating is performed at a temperature of not lower than the first melting point of the PTFE, preferably higher than 340° C., more preferably higher than 345° C., still more preferably 350° C. or higher. The heating time is preferably 10 seconds to 180 minutes.

The heating may be performed using a device such as a salt bath, a sand bath, or a hot air circulating electric furnace.

The temperature-decreasing rate in the rapid cooling is preferably 100° C./hr or higher, more preferably 200° C./hr or higher, still more preferably 300° C./hr or higher.

The rapid cooling can be performed by placing the PTFE molded article having been heated to a temperature not lower than the first melting point of the PTFE in an atmosphere at 100° C. or lower or in water at 100° C. or lower.

The temperature of the atmosphere or water is preferably 50° C. or lower, more preferably 30° C. or lower, and preferably higher than 0° C.

The second dielectric waveguide can be suitably produced by a production method including covering a metal wire with an unsintered PTFE molded article, heating the metal wire to heat the center portion of the unsintered PTFE molded article to a temperature not lower than the first melting point of the PTFE, and removing the metal wire from the PTFE molded article resulting from the heating to obtain a dielectric B.

When the unsintered PTFE molded article is heated from its center portion using a metal wire, PTFE at around the center portion has higher crystallinity, leading to a higher relative permittivity. In contrast, the outer peripheral portion is less heated as compared with the center portion, and therefore has lower crystallinity, leading to a lower relative permittivity. Thus, the resulting dielectric B is seamlessly and integrally formed of a single material and has a relative permittivity that gradually decreases outwardly in the radial direction.

The covering can be performed by paste extrusion molding a mixture containing unsintered PTFE powder and an extrusion aid on the metal wire. After the paste extrusion molding, the resulting extrudate may be dried for removal of the extrusion aid. The mixture may be obtained by mixing unsintered PTFE powder and an extrusion aid by a known method, aging the mixture for 1 hour to 24 hours, and pre-molding the mixture at a pressure of 0.5 to 2.0 MPa.

The paste extrusion can be performed at an extrusion pressure of 2 to 100 MPa.

The metal wire can be heated by applying a voltage to the metal wire for energization. The metal wire is preferably a metal wire that produces heat when energized, such as a nichrome wire, an iron-chromium wire, or a silver-plated copper wire.

The heating is performed in a manner that the center portion of the unsintered PTFE molded article is heated to a temperature not lower than the first melting point of the PTFE, preferably higher than 340° C., more preferably higher than 345° C., still more preferably 350° C. or higher.

For example, the voltage applied to the metal wire is adjusted to set the temperature at the center portion of the unsintered PTFE molded article within the above range.

The heating is preferably performed in a manner that the temperature at the outer peripheral portion of the unsintered PTFE molded article does not reach the first melting point of the PTFE.

The second dielectric waveguide preferably includes the dielectric B as a waveguide medium. The second dielectric waveguide is preferably a dielectric waveguide that transmits high-frequency waves such as millimeter waves and submillimeter waves by utilizing the relative permittivity difference in the dielectric B.

The first and second dielectric waveguides each may have any shape that corresponds to the required characteristics of the dielectric waveguide. Preferably, they each have a linear (bar) shape.

The first dielectric waveguide may have a cross section in a circular shape such as a perfect circle or an ellipse, a quadrate shape such as a square or a rectangle, an annular shape, or the like.

The first and second dielectric waveguides each may also preferably have a curved shape. Normally, in a curved dielectric waveguide, electromagnetic wave penetration is particularly likely to occur. However, electromagnetic wave penetration is not likely to occur in the first and second dielectric waveguides even in curved shapes.

The cross sectional area of each of the first and second dielectric waveguides is appropriately selected in accordance with the frequency of the electromagnetic wave used. When high-frequency waves at 28 GHz are to be transmitted, the cross sectional area is preferably 2 to 10 mm=, more preferably 5 to 9 mm.

Examples of the first and second dielectric waveguides include cylindrical dielectric waveguides, tubular dielectric waveguides, image guides, insular-image guides, trapped image guides, rib guides, strip dielectric waveguides, inverted strip dielectric guides, H guides, and nonradiative dielectric waveguides (NRD guides).

FIG. 1 illustrates an example of the first dielectric waveguide. FIG. 1 illustrates a schematic cross sectional view of a dielectric waveguide including a center dielectric 1, a dielectric layer 2 having a lower relative permittivity than the center dielectric, a dielectric layer 3 having a lower relative permittivity than the dielectric layer 2, and a protective layer 4 (jacket). The center dielectric 1, the dielectric layer 2, and the dielectric layer 3 respectively correspond to the center dielectric A1, the dielectric layer A2, and the dielectric layer A3 in the first dielectric waveguide.

Figure 2:
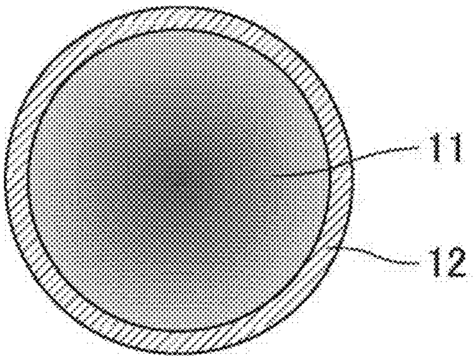
FIG. 2 is a schematic cross-sectional view of an example of a second dielectric waveguide.

FIG. 2 illustrates an example of the second dielectric waveguide. FIG. 2 illustrates a schematic cross sectional view of a dielectric waveguide including a dielectric 11 having a relative permittivity that gradually decreases outwardly in the radial direction from the center, and a protective layer 12 (jacket). The dielectric 11 corresponds to the dielectric B in the second dielectric waveguide.

The configurations of the first and second dielectric waveguides are not limited to those illustrated in drawings.

The disclosure relates to a dielectric waveguide including: a center dielectric A1, a dielectric layer A2 surrounding the center dielectric A1; and a dielectric layer A3 surrounding the dielectric layer A2, the center dielectric A1 containing polytetrafluoroethylene, the center dielectric A1, the dielectric layer A2, and the dielectric layer A3 having relative permittivities $\varepsilon_{A1}$, $\varepsilon_{A2}$, and $\varepsilon_{A3}$, at 25° C. and 6 GHz, respectively, $\varepsilon_{A1}$, $\varepsilon_{A2}$, and $\varepsilon_{A3}$ satisfying the following: $\varepsilon_{A1}$ is 2.20 or lower; $\varepsilon_{A2}$ is 1.90 or lower; $\varepsilon_{A3}$ is 1.55 or lower; and $\varepsilon_{A1}>\varepsilon_{A2}>\varepsilon_{A3}$ is satisfied.

Preferably, the center dielectric A1, the dielectric layer A2, and the dielectric layer A3 have loss tangents tan $\delta_{A1}$, tan $\delta_{A2}$, and tan $\delta_{A3}$ at 25° C. and 6 GHz, respectively, and tan $\delta_{A1}$, tan $\delta_{A2}$, and tan $\delta_{A3}$ satisfy the following: tan $\delta_{A1}$ is $2.20\times10^{-4}$ or lower; tan $\delta_{A2}$ is $1.20\times10^{-4}$ or lower; and tan $\delta_{A3}$ is $1.00\times10^{-4}$ or lower.

Preferably, the dielectric layers A2 and A3 each contain at least one resin A selected from the group consisting of polytetrafluoroethylene, a tetrafluoroethylene/hexafluoropropylene copolymer, a tetrafluoroethylene/perfluoro(alkyl vinyl ether) copolymer, and a polyolefin.

The disclosure also relates to a dielectric waveguide including a dielectric B containing polytetrafluoroethylene, the dielectric B being seamlessly and integrally formed of a single material and having a relative permittivity that gradually decreases outwardly in a radial direction at 25° C. and 6 GHz.

EXAMPLES

The disclosure is more specifically described with reference to, but not limited to, examples.

The numerical values in the examples were measured by the following respective methods.

Permittivity and Loss Tangent (Tan δ)

The relative permittivity of each dielectric (layer) constituting a dielectric waveguide was calculated from the specific gravity of the dielectric (layer) using the relational expression showing the correlation (linear relation) between the specific gravity and the relative permittivity (at 25° C. and 6 GHz).

The specific gravity was measured by hydrostatic weighing (in accordance with JIS Z 8807).

The relational expression used in the calculation is different in accordance with the type of the resin. Any relational expression can be obtained based on the numerical value data of preliminarily obtained specific gravities and relative permittivities. Table 1 shows the numerical value data of the specific gravities and relative permittivities of PTFE as an example of the numerical value data.

TABLE 1

| Specific gravity | Relative permittivity |
|---|---|
| 0.00 | 1.00 |
| 0.71 | 1.40 |
| 1.38 | 1.75 |
| 1.60 | 1.85 |
| 1.80 | 1.96 |
| 2.23 | 2.20 |

The loss tangent of each dielectric (layer) constituting a dielectric waveguide was measured as follows. A sample in a square bar shape (2.0 mm×2.0 mm×110 mm) was cut out of a measurement target dielectric, and the loss tangent of the sample was measured at 25° C. and 6 GHz using a cavity resonator available from Kanto Electronic Application and Development Inc.

Example 1

Formation of Inner Guide

PTFE fine powder (standard specific gravity (SSG): 2.175) in an amount of 2 kg was mixed with 410 g of a hydrocarbon solvent as an extrusion aid, followed by molding of the mixture at 3 MPa. Thus, a pre-molded article having a diameter of 49 mm was formed. The pre-molded article was paste extruded using a PTFE paste extrusion molding machine. Thus, a round bar-shaped extrudate having a diameter of 3.5 mm was obtained. The extrudate was heated in an electric furnace at 80° C. for 30 minutes, and then in an electric furnace at 200° C. for 10 minutes for transpiration of the extrusion aid.

The extrudate from which the extrusion aid had been transpired was placed in an electric furnace heated to 360° C. for 30 minutes for sintering of PTFE, cooled at a temperature-decreasing rate of 60° C./hr to 200° C., and placed at normal temperature for slow cooling. Thus, an inner guide was obtained. The inner guide had a specific gravity of 2.060, a relative permittivity of 2.10, and a loss tangent of 0.00020.

Formation of Intermediate Layer 1

Around the inner guide was wound a PTFE tape in a S-twisted manner at 1-mm intervals to a thickness of 1 mm. The PTFE tape was a rolled, unsintered, unstretched PTFE tape having a thickness of 250 μm and slit to a width of 8 mm. Thus, an intermediate layer 1 was formed. The intermediate layer 1 had a specific gravity of 1.595, a relative permittivity of 1.85, and a loss tangent of 0.00007.

Formation of Intermediate Layer 2

Around the intermediate layer 1 was wound a PTFE tape in a Z-twisted manner at 1-mm intervals to a thickness of 1 mm. The PTFE tape was a 150-μm-thick rolled, unsintered, unstretched PTFE tape stretched to three times the original size and slit to a width of 8 mm. Thus, an intermediate layer 2 was formed. The intermediate layer 2 had a specific gravity of 0.957, a relative permittivity of 1.51, and a loss tangent of 0.00004.

Formation of External Layer

PTFE fine powder (standard specific gravity (SSG): 2.175) in an amount of 2 kg was mixed with 410 g of a hydrocarbon solvent as an extrusion aid, followed by molding of the mixture at 3 MPa. Thus, a pre-molded article having a diameter of 49 mm was formed. The pre-molded article was paste extruded using a PTFE paste extrusion molding machine. Thus, a tubular extrudate having an external diameter of 15 mm and an internal diameter of 7.5 mm was obtained. The extrudate was heated in an electric furnace at 50° C. for one hour, in an electric furnace at 80° C. for one hour, and then in an electric furnace at 200° C. for 10 minutes for transpiration of the extrusion aid.

The extrudate from which the extrusion aid had been transpired was placed in an electric furnace set to 300° C. for 30 minutes, and then stretched to 2.5 times the original length. Thus, a stretched PTFE tube having a specific gravity of 0.657, a relative permittivity of 1.35, and a loss tangent of 0.00003 was formed. With the resulting tube was covered the intermediate layer 2. Thus, an external layer was formed. In this manner, a dielectric waveguide was obtained.

The dielectric waveguide obtained above was cut to a length of 600 mm. Each end was processed to have a conical shape. The resulting dielectric waveguide was inserted to a conical horn antenna. The insertion loss at 60 GHz measured using a network analyzer was −0.18 dB/cm.

A smaller absolute value of the insertion loss indicates less electromagnetic wave penetration.

Example 2

Formation of Inner Guide

PTFE fine powder (standard specific gravity (SSG): 2.175) in an amount of 2 kg was mixed with 410 g of a hydrocarbon solvent as an extrusion aid, followed by molding of the mixture at 3 MPa. Thus, a pre-molded article having a diameter of 49 mm was formed. The pre-molded article was paste extruded using a PTFE paste extrusion molding machine. Thus, a round bar-shaped extrudate having a diameter of 3.5 mm was obtained. The extrudate was heated in an electric furnace at 80° C. for 30 minutes, in an electric furnace at 200° C. for 10 minutes, and then in an electric furnace at 300° C. for 30 minutes for transpiration of the extrusion aid. Thus, an inner guide was obtained. The inner guide had a specific gravity of 1.595, a relative permittivity of 1.85, and a loss tangent of 0.00007.

Formation of Intermediate Layer 1

Around the inner guide was wound a PTFE tape in a Z-twisted manner at 1-mm intervals to a thickness of 1 mm. The PTFE tape was a 150-μm-thick rolled, unsintered, unstretched PTFE tape stretched to three times the original size and slit to a width of 8 mm. Thus, an intermediate layer 1 was formed. The intermediate layer 1 had a specific gravity of 0.957, a relative permittivity of 1.51, and a loss tangent of 0.00004.

Formation of External Layer

PTFE fine powder (standard specific gravity (SSG): 2.175) in an amount of 2 kg was mixed with 410 g of a hydrocarbon solvent as an extrusion aid, followed by molding of the mixture at 3 MPa. Thus, a pre-molded article having a diameter of 49 mm was formed. The pre-molded article was paste extruded using a PTFE paste extrusion molding machine. Thus, a tubular extrudate having an external diameter of 15 mm and an internal diameter of 7.5 mm was obtained. The extrudate was heated in an electric furnace at 50° C. for one hour, in an electric furnace at 80° C. for one hour, and then in an electric furnace at 200° C. for 10 minutes for transpiration of the extrusion aid.

The tube from which the extrusion aid had been transpired was placed in an electric furnace set to 300° C. for 30 minutes, and then stretched to 2.5 times the original length. Thus, a stretched PTFE tube having a specific gravity of 0.657, a relative permittivity of 1.35, and a loss tangent of 0.00003 was formed. With the resulting tube was covered the intermediate layer 1. Thus, an external layer was formed. In this manner, a dielectric waveguide was obtained.

The dielectric waveguide obtained above was cut to a length of 600 mm. Each end was processed to have a conical shape, and inserted to a circular waveguide. The insertion loss at 60 GHz measured using a network analyzer was −0.17 dB/cm.

Example 3

Formation of Inner Guide

PTFE fine powder (standard specific gravity (SSG): 2.175) in an amount of 2 kg was mixed with 410 g of a hydrocarbon solvent as an extrusion aid, followed by molding of the mixture at 3 MPa. Thus, a pre-molded article having a diameter of 49 mm was formed. The pre-molded article was paste extruded using a paste extrusion molding machine. Thus, a 3.5 mm×7 mm square bar-shaped extrudate was obtained. The extrudate was heated in an electric furnace at 50° C. for 30 minutes, in an electric furnace at 80° C. for 30 minutes, and then in an electric furnace at 200° C. for 10 minutes for transpiration of the extrusion aid.

The extrudate from which the extrusion aid had been transpired was placed in an electric furnace heated to 360° C. for 30 minutes for sintering of PTFE, cooled at a temperature-decreasing rate of 60° C./hr to 200° C., and placed at normal temperature for slow cooling. Thus, an inner guide was obtained. The inner guide had a specific gravity of 2.158, a relative permittivity of 2.15, and a loss tangent of 0.00010.

Formation of Intermediate Layer 1

Around the inner guide was wound a PTFE tape in an S-twisted manner at 1-mm intervals to a thickness of 2 mm. Thus, an intermediate layer 1 was formed. The PTFE tape was a rolled, unsintered, unstretched PTFE tape having a thickness of 250 μm and slit to a width of 8 mm. The intermediate layer 1 had a specific gravity of 1.595, a relative permittivity of 1.85, and a loss tangent of 0.00007.

Formation of Intermediate Layer 2

Around the intermediate layer 1 was wound a PTFE tape in a Z-twisted manner at 1-mm intervals to a thickness of 2 mm. The PTFE tape was a 150-μm-thick rolled, unsintered, unstretched PTFE tape stretched to three times the original size and slit to a width of 8 mm. Thus, an intermediate layer 2 was formed. The intermediate layer 2 had a specific gravity of 0.957, a relative permittivity of 1.51, and a loss tangent of 0.00004.

Formation of External Layer

Around the intermediate layer 2 was wound a PTFE tape in an S-twisted manner at 1-mm intervals to a thickness of 1 mm. The PTFE tape was a 100-μm-thick rolled, unsintered, unstretched PTFE tape stretched to five times the original size and slit to a width of 8 mm. Thus, an external layer was formed. The external layer had a specific gravity of 0.657, a relative permittivity of 1.35, and a loss tangent of 0.00003.

The external layer was covered with a heat-shrinkable FEP tube, followed by heating using a hot gun. Thus, the tube was shrunk to form a protective layer. In this manner, a dielectric waveguide was obtained.

The dielectric waveguide obtained above was cut to a length of 600 mm. Each end was processed to have a quadrangular pyramid shape (1:2), and inserted to a pyramidal horn antenna. The insertion loss at 28 GHz measured using a network analyzer was −0.25 dB/cm.

Example 4

Formation of Inner Guide

PTFE fine powder (standard specific gravity (SSG): 2.175) in an amount of 2 kg was mixed with 410 g of a hydrocarbon solvent as an extrusion aid, followed by molding of the mixture at 3 MPa. Thus, a pre-molded article having a diameter of 49 mm was formed. The pre-molded article was paste extruded using a PTFE paste extrusion molding machine. Thus, a round bar-shaped extrudate having a diameter of 3.5 mm was obtained. The extrudate was heated in an electric furnace at 50° C. for one hour, in an electric furnace at 80° C. for one hour, and then in an electric furnace at 200° C. for 10 minutes for transpiration of the extrusion aid. Thus, an inner guide was obtained. The inner guide had a specific gravity of 2.158, a relative permittivity of 2.15, and a loss tangent of 0.00010.

Formation of Intermediate Layer 1

PTFE fine powder (standard specific gravity (SSG): 2.175) in an amount of 2 kg was mixed with 410 g of a hydrocarbon solvent as an extrusion aid, followed by molding of the mixture at 3 MPa. Thus, a pre-molded article having a diameter of 49 mm was formed. The pre-molded article was paste extruded using a PTFE paste extrusion molding machine. Thus, a tubular extrudate having an external diameter of 6.5 mm and an internal diameter of 3.5 mm was obtained. The extrudate was heated in an electric furnace at 50° C. for one hour, in an electric furnace at 80° C. for one hour, and then in an electric furnace at 200° C. for 10 minutes for transpiration of the extrusion aid. With this tube was covered the inner guide. Thus, an intermediate layer 1 was formed. The intermediate layer 1 had a specific gravity of 1.80, a relative permittivity of 1.96, and a loss tangent of 0.00009.

Formation of Intermediate Layer 2

A tubular extrudate having an external diameter of 10 mm and an internal diameter of 6.5 mm was obtained as in the case of the intermediate layer 1. The extrudate was heated in an electric furnace at 50° C. for one hour, in an electric furnace at 80° C. for one hour, and then in an electric furnace at 200° C. for 10 minutes for transpiration of the extrusion aid. The tube was placed in an electric furnace set to 300° C. for 30 minutes, and then stretched to 2.5 times the original length. Thus, a stretched PTFE tube having a specific gravity of 1.6, a relative permittivity of 1.85, and a loss tangent of 0.00007 was formed. With this tube was covered the intermediate layer 1. Thus, an intermediate layer 2 was formed.

Formation of External Layer

A tubular extrudate having an external diameter of 18 mm and an internal diameter of 10 mm was obtained as in the case of the intermediate layer 1. The extrudate was heated in an electric furnace at 50° C. for one hour, in an electric furnace at 80° C. for one hour, and then in an electric furnace at 200° C. for 10 minutes for transpiration of the extrusion aid. The tube was placed in an electric furnace set to 300° C. for 30 minutes, and then stretched to three times the original length. Thus, a stretched PTFE tube having a specific gravity of 0.71, a relative permittivity of 1.4, and a loss tangent of 0.00003 was formed. With this tube was covered the intermediate layer 2. Thus, an external layer was formed.

The dielectric waveguide obtained above was cut to a length of 600 mm. Each end was processed to have a conical shape, and inserted to a circular waveguide. The insertion loss at 60 GHz measured using a network analyzer was −0.17 dB/cm.

Example 5

PTFE fine powder (standard specific gravity (SSG): 2.175) in an amount of 2 kg was mixed with 410 g of a hydrocarbon solvent as an extrusion aid, followed by molding of the mixture at 3 MPa. Thus, a pre-molded article having a diameter of 49 mm was formed. The pre-molded article was paste extruded using a PTFE paste extrusion molding machine. Thus, a round bar-shaped extrudate having a diameter of 9 mm was obtained. The extrudate was heated in an electric furnace at 50° C. for one hour, in an electric furnace at 100° C. for one hour, and then in an electric furnace at 200° C. for 10 minutes for transpiration of the extrusion aid.

The extrudate from which the extrusion aid had been transpired was placed in an electric furnace heated to 340° C. for 15 minutes for sintering of PTFE. The resulting sintered PTFE round bar was immediately placed in a normal temperature atmosphere for rapid cooling of the surface. Thus, a dielectric waveguide having a relative permittivity that gradually decreases outwardly in the radial direction was obtained.

The dielectric waveguide obtained above had a specific gravity of 2.23 and a relative permittivity of 2.20 at the center portion, a specific gravity of 2.17 and a relative permittivity of 2.08 at a portion of about 2.3 mm in the radial direction from the center, and a specific gravity of 2.10 and a relative permittivity of 1.95 at the outer peripheral portion.

The dielectric waveguide obtained above was cut to a length of 600 mm. Each end was processed to have a conical shape, and inserted to a circular waveguide. The insertion loss at 60 GHz measured using a network analyzer was −0.19 dB/cm.

Example 6

PTFE fine powder (standard specific gravity (SSG): 2.175) in an amount of 2 kg was mixed with 410 g of a hydrocarbon solvent as an extrusion aid, followed by molding of the mixture at 3 MPa. Thus, a pre-molded article having a diameter of 49 mm and an internal diameter of 16 mm was formed. With the pre-molded article was extrusion coated a 0.511-mm silver-plated copper wire using a PTFE paste extrusion molding machine. Thus, a coating extrudate having a diameter of 9.0 mm was obtained. The extrudate was heated in an electric furnace at 50° C. for one hour, in an electric furnace at 80° C. for one hour, and then in an electric furnace at 200° C. for 10 minutes for transpiration of the extrusion aid.

The extrudate from which the extrusion aid had been transpired was cut to a length of 2 m. A DC power source was connected to ends of the silver-plated copper wire. Under application of 7.5 V, the amount of current passing through the wire was 15 A. Voltage application was stopped when the surface temperature of the extrudate reached 250° C., followed by cooling to normal temperature. Then, the silver-plated wire was pulled out. Thus, a dielectric waveguide was obtained.

The dielectric waveguide obtained above had a specific gravity of 2.23 and a relative permittivity of 2.20 at around the center portion (portion where the copper wire had been present), a specific gravity of 2.17 and a relative permittivity of 2.08 at a portion of about 2.3 mm in the radial direction from the center, and a specific gravity of 2.10 and a relative permittivity of 1.95 at the outer peripheral portion.

The dielectric waveguide obtained above was cut to a length of 600 mm. Each end was processed to have a conical shape, and inserted to a circular waveguide. The insertion loss at 60 GHz measured using a network analyzer was −0.20 dB/cm.

Example 7

Formation of Inner Guide

PTFE fine powder (standard specific gravity (SSG): 2.175) in an amount of 2 kg was mixed with 410 g of a hydrocarbon solvent as an extrusion aid, followed by molding of the mixture at 3 MPa. Thus, a pre-molded article having a diameter of 49 mm was formed. The pre-molded article was paste extruded using a PTFE paste extrusion molding machine. Thus, a round bar-shaped extrudate having a diameter of 3.5 mm was obtained. The extrudate was heated in an electric furnace at 80° C. for 30 minutes, and then in an electric furnace at 200° C. for 10 minutes for transpiration of the extrusion aid.

The extrudate from which the extrusion aid had been transpired was placed in an electric furnace heated to 360° C. for 30 minutes for sintering of PTFE, cooled at a temperature-decreasing rate of 60° C./hr to 200° C., and placed at normal temperature for slow cooling. Thus, an inner guide was obtained. The inner guide had a specific gravity of 2.060, a relative permittivity of 2.10, and a loss tangent of 0.00020.

Formation of Intermediate Layer 1

The inner guide was covered with a foamed PE tube obtained from polyethylene (PE). The intermediate layer 1 thus obtained had an internal diameter of 3.6 mm, an external diameter of 10.5 mm, a specific gravity of 0.396, a relative permittivity of 1.56, and a loss tangent of 0.00003.

Formation of External Layer

Around the intermediate layer 1 was wound one layer of a foamed PE sheet (thickness of 9 mm, width of 10 mm) obtained from PE. Thus, an external layer was formed. In this manner, a dielectric waveguide was obtained. The external layer had a specific gravity of 0.01569, a relative permittivity of 1.03, and a loss tangent of 0.00002.

The dielectric waveguide obtained above was cut to a length of 600 mm. Each end was processed to have a conical shape. The resulting dielectric waveguide was inserted to a horn antenna. The insertion loss at 60 GHz measured using a network analyzer was −0.17 dB/cm.

Example 8

Formation of Inner Guide

PTFE fine powder (standard specific gravity (SSG): 2.175) in an amount of 2 kg was mixed with 410 g of a hydrocarbon solvent as an extrusion aid, followed by molding of the mixture at 3 MPa. Thus, a pre-molded article having a diameter of 49 mm was formed. The pre-molded article was paste extruded using a PTFE paste extrusion molding machine. Thus, a round bar-shaped extrudate having a diameter of 3.5 mm was obtained. The extrudate was heated in an electric furnace at 80° C. for 30 minutes, and then in an electric furnace at 200° C. for 10 minutes for transpiration of the extrusion aid.

The extrudate from which the extrusion aid had been transpired was placed in an electric furnace heated to 360° C. for 30 minutes for sintering of PTFE, cooled at a temperature-decreasing rate of 60° C./hr to 200° C., and placed at normal temperature for slow cooling. Thus, an inner guide was obtained. The inner guide had a specific gravity of 2.060, a relative permittivity of 2.10, and a loss tangent of 0.00020.

Formation of Intermediate Layer 1

The inner guide was covered with a foamed PFA tube obtained from PFA. The intermediate layer 1 thus obtained had an internal diameter of 3.6 mm, an external diameter of 10.5 mm, a specific gravity of 1.2, a relative permittivity of 1.5, and a loss tangent of 0.0002.

Formation of External Layer

Around the intermediate layer 1 was wound one layer of a foamed PFA sheet (thickness of 9 mm, width of 10 mm) obtained from PFA. Thus, an external layer was formed. In this manner, a dielectric waveguide was obtained. The external layer had a specific gravity of 1.0, a relative permittivity of 1.2, and a loss tangent of 0.00008.

Example 9

Formation of Inner Guide

PTFE fine powder (standard specific gravity (SSG): 2.175) in an amount of 2 kg was mixed with 410 g of a hydrocarbon solvent as an extrusion aid, followed by molding of the mixture at 3 MPa. Thus, a pre-molded article having a diameter of 49 mm was formed. The pre-molded article was paste extruded using a PTFE paste extrusion molding machine. Thus, a round bar-shaped extrudate having a diameter of 3.5 mm was obtained. The extrudate was heated in an electric furnace at 80° C. for 30 minutes, and then in an electric furnace at 200° C. for 10 minutes for transpiration of the extrusion aid.

The extrudate from which the extrusion aid had been transpired was placed in an electric furnace heated to 360°

C. for 30 minutes for sintering of PTFE, cooled at a temperature-decreasing rate of 60° C./hr to 200° C., and placed at normal temperature for slow cooling. Thus, an inner guide was obtained. The inner guide had a specific gravity of 2.060, a relative permittivity of 2.10, and a loss tangent of 0.00020.

Formation of Intermediate Layer 1

The inner guide was covered with a foamed FEP tube obtained from FEP. The intermediate layer 1 thus obtained had an internal diameter of 3.6 mm, an external diameter of 10.5 mm, a specific gravity of 1.1, a relative permittivity of 1.5, and a loss tangent of 0.0002.

Formation of External Layer

Around the intermediate layer 1 was wound one layer of a foamed FEP sheet (thickness of 9 mm, width of 10 mm) obtained from FEP. Thus, an external layer was formed. In this manner, a dielectric waveguide was obtained. The external layer had a specific gravity of 1.0, a relative permittivity of 1.1, and a loss tangent of 0.00007.

Comparative Example 1

Formation of Inner Guide

PTFE fine powder (standard specific gravity (SSG): 2.175) in an amount of 2 kg was mixed with 410 g of a hydrocarbon solvent as an extrusion aid, followed by molding of the mixture at 3 MPa. Thus, a pre-molded article having a diameter of 49 mm was formed. The pre-molded article was paste extruded using a PTFE paste extrusion molding machine. Thus, a round bar-shaped extrudate having a diameter of 3.5 mm was obtained. The extrudate was heated in an electric furnace at 50° C. for one hour, in an electric furnace at 80° C. for one hour, and then in an electric furnace at 200° C. for 10 minutes for transpiration of the extrusion aid.

The extrudate from which the extrusion aid had been transpired was placed in an electric furnace heated to 360° C. for 30 minutes for sintering of PTFE, cooled at a temperature-decreasing rate of 60° C./hr to 200° C., and placed at normal temperature for slow cooling. Thus, an inner guide was obtained. The inner guide had a specific gravity of 2.060, a relative permittivity of 2.10, and a loss tangent of 0.0002.

Formation of External Layer

PTFE fine powder (standard specific gravity (SSG): 2.175) in an amount of 2 kg was mixed with 410 g of a hydrocarbon solvent as an extrusion aid, followed by molding of the mixture at 3 MPa. Thus, a pre-molded article having a diameter of 49 mm was formed. The pre-molded article was paste extruded using a PTFE paste extrusion molding machine. Thus, a tubular extrudate having an external diameter of 15 mm and an internal diameter of 3.5 mm was obtained. The extrudate was heated in an electric furnace at 50° C. for one hour, in an electric furnace at 80° C. for one hour, and then in an electric furnace at 200° C. for 10 minutes for transpiration of the extrusion aid.

The unsintered PTFE tube was placed in an electric furnace at 300° C. for one hour, stretched to 2.5 times the original length, and cooled to normal temperature with the length maintained. Thus, an external layer tube having a specific gravity of 0.582, a relative permittivity of 1.31, and a loss tangent of 0.00003 was obtained.

The inner guide was covered with the external layer tube. Thus, an external layer was formed.

The external layer was covered with a heat-shrinkable FEP tube, followed by heating using a hot gun. Thus, the tube was shrunk to form a protective layer. In this manner, a dielectric waveguide was obtained.

The dielectric waveguide obtained above was cut to a length of 600 mm. Each end was processed to have a conical shape, and inserted to a circular waveguide. The insertion loss at 60 GHz measured by network analyzer was −0.21 dB/cm.

Comparative Example 2

Formation of Inner Guide

PTFE fine powder (standard specific gravity (SSG): 2.175) in an amount of 2 kg was mixed with 410 g of a hydrocarbon solvent as an extrusion aid, followed by molding of the mixture at 3 MPa. Thus, a pre-molded article having a diameter of 49 mm was formed. The pre-molded article was paste extruded using a PTFE paste extrusion molding machine. Thus, a 3.5 mm×7 mm square bar-shaped extrudate was obtained. The extrudate was heated in an electric furnace at 50° C. for one hour, in an electric furnace at 80° C. for one hour, and then in an electric furnace at 200° C. for 10 minutes for transpiration of the extrusion aid.

The extrudate from which the extrusion aid had been transpired was placed in an electric furnace heated to 360° C. for 30 minutes for sintering of PTFE, cooled at a temperature-decreasing rate of 60° C./hr to 200° C., and placed at normal temperature for slow cooling. Thus, an inner guide was obtained. The inner guide had a specific gravity of 2.158, a relative permittivity of 2.15, and a loss tangent of 0.00010.

Formation of External Layer

Around the inner guide was wound several times a 100-μm-thick rolled, unsintered, unstretched PTFE tape slit to a width of 8 mm, in an S-twisted manner at 1-mm intervals. Thus, an external layer having a thickness of 5 mm was formed. The external layer had a specific gravity of 0.657, a relative permittivity of 1.35, and a loss tangent of 0.00003.

The external layer was covered with a heat-shrinkable FEP tube, followed by heating using a hot gun. Thus, the tube was shrunk to form a protective layer. In this manner, a dielectric waveguide was obtained.

The dielectric waveguide obtained above was cut to a length of 600 mm. Each end was processed to have a quadrangular pyramid shape (1:2), and inserted to a pyramidal horn antenna. The insertion loss at 28 GHz measured using a network analyzer was −0.35 dB/cm.

The invention claimed is:

1. A dielectric waveguide comprising:

a center dielectric A1;

a dielectric layer A2 surrounding the center dielectric A1; and a dielectric layer A3 surrounding the dielectric layer A2, the center dielectric A1 comprising polytetrafluoroethylene, the center dielectric A1, the dielectric layer A2, and the dielectric layer A3 having relative permittivities $\varepsilon_{A1}$, $\varepsilon_{A2}$, and $\varepsilon_{A3}$ at 25° C. and 6 GHz, respectively, $\varepsilon_{A1}$, $\varepsilon_{A2}$, and $\varepsilon_{A3}$ satisfying the following: $\varepsilon_{A1}$ is 2.20 or lower; $\varepsilon_{A2}$ is 1.90 or lower; $\varepsilon_{A3}$ is 1.55 or lower; and $\varepsilon_{A1}>\varepsilon_{A2}>\varepsilon_{A3}$ is satisfied, wherein a ratio $\varepsilon_{A2}/\varepsilon_{A1}$ of $\varepsilon_{A2}$ to $\varepsilon_{A1}$ is 0.65 to 0.95, and a ratio $\varepsilon_{A3}/\varepsilon_{A2}$ of $\varepsilon_{A3}$ to $\varepsilon_{A2}$ is 0.65 to 0.95, the specific gravity of the dielectric layer A2 is lower than the specific gravity of the center dielectric A1, and the specific gravity of the dielectric layer A3 is lower than the specific gravity of the dielectric layer A2.

2. The dielectric waveguide according to claim 1, wherein the center dielectric A1, the dielectric layer A2, and the dielectric layer A3 have loss tangents tan $\delta_{A1}$, tan $\delta_{A2}$, and tan $\delta_{A3}$ at 25° C. and 6 GHz, respectively and tan $\delta_{A1}$, tan $\delta_{A2}$, and tan $\delta_{A3}$ satisfy the following: tan $\delta_{A1}$ is $2.20\times10^{-4}$ or lower; tan $\delta_{A2}$ is $1.20\times10^{-4}$ or lower; and tan $\delta_{A3}$ is $1.00\times10^{-4}$ or lower.

3. The dielectric waveguide according to claim 2, wherein the dielectric layers A2 and A3 each contain at least one resin A selected from the group consisting of polytetrafluoroethylene, a tetrafluoroethylene/hexafluoropropylene copolymer, a tetrafluoroethylene/perfluoro (alkyl vinyl ether) copolymer, and a polyolefin.

4. The dielectric waveguide according to claim 1, wherein the dielectric layers A2 and A3 each contain at least one resin A selected from the group consisting of polytetrafluoroethylene, a tetrafluoroethylene/hexafluoropropylene copolymer, a tetrafluoroethylene/perfluoro (alkyl vinyl ether) copolymer, and a polyolefin.

5. A dielectric waveguide comprising:

a dielectric B comprising polytetrafluoroethylene, the dielectric B being seamlessly and integrally formed of a single material and having a relative permittivity that continuously gradually decreases outwardly in a radial direction at 25° C. and 6 GHZ, wherein in the dielectric B, the relative permittivity decreasing rate is 0.005% or higher and 20% or lower, per millimeter outwardly in the radial direction.

* * * * *